United States Patent
Natarajan et al.

(10) Patent No.: US 11,038,869 B1
(45) Date of Patent: Jun. 15, 2021

(54) METHODS FOR MANAGING A FEDERATED IDENTITY ENVIRONMENT BASED ON APPLICATION AVAILABILITY AND DEVICES THEREOF

(71) Applicant: F5 Networks, Inc., Seattle, WA (US)

(72) Inventors: Ravi Natarajan, Fremont, CA (US); Saxon Amdahl, Portola Valley, CA (US)

(73) Assignee: F5 NETWORKS, INC., Seattle, WA (US)

( * ) Notice: Subject to any disclaimer, the term of this patent is extended or adjusted under 35 U.S.C. 154(b) by 172 days.

(21) Appl. No.: 15/968,027

(22) Filed: May 1, 2018

Related U.S. Application Data (60) Provisional application No. 62/505,565, filed on May 12, 2017.

(51) Int. Cl.
*H04L 29/06* (2006.01)

(52) U.S. Cl.
CPC ........ *H04L 63/0807* (2013.01); *H04L 63/083* (2013.01); *H04L 63/0876* (2013.01); *H04L 63/10* (2013.01)

(58) Field of Classification Search
CPC ............... H04L 63/083; H04L 63/0876; H04L 63/0807; H04L 63/10
See application file for complete search history.

(56) References Cited

U.S. PATENT DOCUMENTS

| | | | |
|---|---|---|---|
| 4,783,828 A | 11/1988 | Sadjadi | |
| 5,537,488 A | 7/1996 | Menon et al. | |
| 6,118,893 A | 9/2000 | Li | |
| 6,314,408 B1 | 11/2001 | Salas et al. | |
| 6,597,777 B1 | 7/2003 | Ho | |
| 6,748,056 B1 | 6/2004 | Capriotti et al. | |
| 6,769,066 B1 | 7/2004 | Botros et al. | |
| 7,100,195 B1 | 8/2006 | Underwood | |
| 7,228,412 B2 | 6/2007 | Freed et al. | |
| 7,406,606 B2 | 7/2008 | Chawla et al. | |
| 7,441,429 B1 | 10/2008 | Nucci et al. | |

(Continued)

FOREIGN PATENT DOCUMENTS

| | | |
|---|---|---|
| WO | 2010/043722 A1 | 4/2010 |
| WO | 2017/016454 A1 | 2/2017 |

OTHER PUBLICATIONS

E. Hammer-Lahav, Ed., RFC 5849 "The OAuth 1.0 Protocol", Apr. 2010, Internet Engineering Task Force (IETF), pp. 1-38.*

(Continued)

*Primary Examiner* — Robert B Leung
*Assistant Examiner* — Thomas Ho
(74) *Attorney, Agent, or Firm* — Troutman Pepper Hamilton Sanders LLP (Rochester)

(57) ABSTRACT

Methods, non-transitory computer readable media, and network traffic manager apparatus that assists with managing a federated identity environment based on application availability includes identifying a current status of one or more applications. Next, a response to a received request is generated based on the identified current status and a status of user authentication, wherein the generated response comprises an access token and a notification message corresponding to the identified current status. The generated response is provided to the client.

20 Claims, 4 Drawing Sheets

(56) References Cited

U.S. PATENT DOCUMENTS

| | | | |
|---|---|---|---|
| 7,519,834 B1 | 4/2009 | Dondeti et al. | |
| 7,624,447 B1 | 11/2009 | Horowitz et al. | |
| 7,743,415 B2 | 6/2010 | Poletto et al. | |
| 8,126,722 B2 | 2/2012 | Robb et al. | |
| 8,185,475 B2 | 5/2012 | Hug | |
| 8,370,407 B1 | 2/2013 | Devarajan et al. | |
| 8,572,733 B1 | 10/2013 | Rockwood | |
| 8,832,804 B1 | 9/2014 | Casey et al. | |
| 8,943,548 B2 | 1/2015 | Drokov et al. | |
| 8,943,588 B1 | 1/2015 | Speegle et al. | |
| 9,055,093 B2 | 6/2015 | Borders | |
| 9,077,709 B1 | 7/2015 | Dall et al. | |
| 9,237,021 B2 | 1/2016 | Mills et al. | |
| 9,325,697 B2 | 4/2016 | Datta et al. | |
| 9,338,007 B1* | 5/2016 | Doshi | H04L 63/0815 |
| 9,397,990 B1* | 7/2016 | Taly | H04L 63/08 |
| 9,438,419 B1 | 9/2016 | Aggarwal et al. | |
| 9,444,916 B2 | 9/2016 | Backholm | |
| 9,578,055 B1 | 2/2017 | Khanal | |
| 9,589,114 B2 | 3/2017 | Strom et al. | |
| 9,628,499 B1 | 4/2017 | Yu et al. | |
| 9,654,485 B1 | 5/2017 | Neumann | |
| 9,705,895 B1 | 7/2017 | Gutzmann | |
| 9,705,902 B1 | 7/2017 | Call et al. | |
| 9,800,602 B2 | 10/2017 | Shekyan et al. | |
| 9,900,344 B2 | 2/2018 | Smith et al. | |
| 9,967,250 B2 | 5/2018 | Johansson et al. | |
| 10,169,937 B1 | 1/2019 | Zwink et al. | |
| 10,574,697 B1 | 2/2020 | McClintock et al. | |
| 2002/0116615 A1 | 8/2002 | Nguyen et al. | |
| 2003/0004882 A1* | 1/2003 | Holler | G06F 8/65 705/51 |
| 2003/0009538 A1* | 1/2003 | Shah | H04L 63/0281 709/219 |
| 2003/0042439 A1 | 3/2003 | Rusu et al. | |
| 2003/0073091 A1 | 4/2003 | Krylov et al. | |
| 2003/0145232 A1 | 7/2003 | Poletto et al. | |
| 2003/0182447 A1 | 9/2003 | Schilling | |
| 2003/0199762 A1 | 10/2003 | Fritz et al. | |
| 2004/0037326 A1 | 2/2004 | D'Souza et al. | |
| 2004/0103283 A1 | 5/2004 | Hornak | |
| 2004/0170123 A1 | 9/2004 | Carpenter et al. | |
| 2005/0027846 A1 | 2/2005 | Wolfe et al. | |
| 2005/0111367 A1 | 5/2005 | Chao et al. | |
| 2005/0195840 A1 | 9/2005 | Krapp et al. | |
| 2005/0198519 A1 | 9/2005 | Tamura et al. | |
| 2005/0278547 A1* | 12/2005 | Hyndman | G06Q 20/4014 713/185 |
| 2006/0031483 A1 | 2/2006 | Lund et al. | |
| 2006/0031928 A1 | 2/2006 | Conley et al. | |
| 2006/0098675 A1* | 5/2006 | Okuno | H04L 49/90 370/412 |
| 2006/0288411 A1 | 12/2006 | Garg et al. | |
| 2007/0118894 A1 | 5/2007 | Bhatia | |
| 2007/0219917 A1 | 9/2007 | Liu et al. | |
| 2007/0280114 A1 | 12/2007 | Chao et al. | |
| 2007/0294187 A1 | 12/2007 | Scherrer | |
| 2008/0010207 A1 | 1/2008 | Yanagihara et al. | |
| 2008/0028467 A1 | 1/2008 | Kommareddy et al. | |
| 2008/0059797 A1 | 3/2008 | Tokuno et al. | |
| 2008/0082662 A1 | 4/2008 | Dandliker et al. | |
| 2008/0196099 A1 | 8/2008 | Shastri | |
| 2008/0263215 A1 | 10/2008 | Schnellbaecher | |
| 2008/0320567 A1 | 12/2008 | Shulman et al. | |
| 2009/0052330 A1 | 2/2009 | Matsunaga et al. | |
| 2009/0167520 A1 | 7/2009 | Watanabe et al. | |
| 2009/0172162 A1 | 7/2009 | Wood | |
| 2009/0199297 A1 | 8/2009 | Jarrett et al. | |
| 2009/0241173 A1 | 9/2009 | Troyansky | |
| 2009/0241174 A1 | 9/2009 | Rajan et al. | |
| 2009/0265784 A1 | 10/2009 | Ivaizumi et al. | |
| 2010/0017627 A1 | 1/2010 | Princen et al. | |
| 2010/0031315 A1 | 2/2010 | Feng et al. | |
| 2010/0070451 A1 | 3/2010 | Hugues | |
| 2010/0070620 A1 | 3/2010 | Awadallah et al. | |
| 2010/0088752 A1* | 4/2010 | Nagulakonda | H04L 63/123 726/6 |
| 2010/0284282 A1 | 11/2010 | Golic | |
| 2010/0312875 A1 | 12/2010 | Wilerson et al. | |
| 2010/0325418 A1 | 12/2010 | Kanekar | |
| 2011/0012586 A1 | 1/2011 | Montanari et al. | |
| 2011/0072516 A1 | 3/2011 | Cohen et al. | |
| 2011/0083181 A1 | 4/2011 | Nazarov | |
| 2011/0138463 A1 | 6/2011 | Kim et al. | |
| 2011/0154026 A1 | 6/2011 | Edstrom et al. | |
| 2011/0197177 A1 | 8/2011 | Mony | |
| 2011/0264621 A1 | 10/2011 | Burjoski | |
| 2011/0264905 A1 | 10/2011 | Ovsiannikov | |
| 2011/0280160 A1 | 11/2011 | Yang | |
| 2012/0017090 A1 | 1/2012 | Gould et al. | |
| 2012/0023090 A1 | 1/2012 | Holloway et al. | |
| 2012/0079592 A1 | 3/2012 | Pandrangi | |
| 2012/0090030 A1 | 4/2012 | Rapaport et al. | |
| 2012/0110646 A1* | 5/2012 | Ajitomi | H04L 63/10 726/4 |
| 2012/0117621 A1 | 5/2012 | Kondamuru et al. | |
| 2012/0144487 A1 | 6/2012 | Kim et al. | |
| 2012/0167210 A1 | 6/2012 | Oro Garcia et al. | |
| 2012/0173710 A1 | 7/2012 | Rodriguez | |
| 2012/0203904 A1 | 8/2012 | Niemela et al. | |
| 2012/0233665 A1 | 9/2012 | Ranganathan et al. | |
| 2012/0254386 A1 | 10/2012 | Smith et al. | |
| 2012/0323700 A1 | 12/2012 | Aleksandrovich et al. | |
| 2013/0080407 A1 | 3/2013 | Levow | |
| 2013/0081129 A1 | 3/2013 | Niemela | |
| 2013/0174277 A1* | 7/2013 | Kiukkonen | H04L 63/104 726/28 |
| 2013/0276114 A1 | 10/2013 | Friedrichs et al. | |
| 2014/0040993 A1* | 2/2014 | Lorenzo | G06F 21/41 726/4 |
| 2014/0090071 A1* | 3/2014 | Salehie | G06F 21/50 726/25 |
| 2014/0095865 A1 | 4/2014 | Yerra et al. | |
| 2014/0157405 A1 | 6/2014 | Joll et al. | |
| 2014/0181922 A1 | 6/2014 | Jakobsson | |
| 2014/0230051 A1 | 8/2014 | Vallinayagam et al. | |
| 2014/0289854 A1 | 9/2014 | Mahvi | |
| 2014/0298419 A1 | 10/2014 | Boubez et al. | |
| 2014/0317739 A1 | 10/2014 | Be'ery et al. | |
| 2014/0337954 A1* | 11/2014 | Ahmed | H04L 63/0815 726/8 |
| 2014/0373088 A1 | 12/2014 | Aggarwal et al. | |
| 2015/0026766 A1 | 1/2015 | Holloway et al. | |
| 2015/0067328 A1 | 3/2015 | Yin | |
| 2015/0088662 A1 | 3/2015 | Moller et al. | |
| 2015/0128236 A1 | 5/2015 | Moscicki et al. | |
| 2015/0163234 A1 | 6/2015 | Tal et al. | |
| 2015/0215334 A1 | 7/2015 | Bingham et al. | |
| 2015/0271179 A1 | 9/2015 | Wang et al. | |
| 2015/0295945 A1 | 10/2015 | Canzanese, Jr. et al. | |
| 2015/0310196 A1 | 10/2015 | Turgeman et al. | |
| 2015/0341379 A1 | 11/2015 | Lefebvre et al. | |
| 2015/0350186 A1* | 12/2015 | Chan | H04L 63/083 726/9 |
| 2016/0014119 A1* | 1/2016 | Inoue | H04L 63/0853 726/9 |
| 2016/0021117 A1 | 1/2016 | Harmon et al. | |
| 2016/0057140 A1 | 2/2016 | Heeter et al. | |
| 2016/0065579 A1* | 3/2016 | Chen | G06F 21/45 726/4 |
| 2016/0080345 A1 | 3/2016 | Safruti et al. | |
| 2016/0080412 A1 | 3/2016 | Smith et al. | |
| 2016/0127406 A1 | 5/2016 | Smith et al. | |
| 2016/0328715 A1 | 11/2016 | Gideoni et al. | |
| 2016/0352774 A1 | 12/2016 | Akcin | |
| 2016/0381022 A1 | 12/2016 | Jackson et al. | |
| 2017/0006033 A1 | 1/2017 | Stecher et al. | |
| 2017/0063923 A1 | 3/2017 | Yang et al. | |
| 2017/0171231 A1 | 6/2017 | Reybok, Jr. et al. | |
| 2017/0208483 A1 | 7/2017 | Chmiel et al. | |
| 2017/0249306 A1 | 8/2017 | Allen et al. | |
| 2017/0318053 A1 | 11/2017 | Singh et al. | |
| 2018/0124110 A1 | 5/2018 | Hunt et al. | |

(56) References Cited

U.S. PATENT DOCUMENTS

| | | | |
|---|---|---|---|
| 2018/0124300 A1 | 5/2018 | Brook | |
| 2018/0152356 A1* | 5/2018 | Dhariwal | H04L 41/22 |
| 2019/0238554 A1 | 8/2019 | Disraeli | |

OTHER PUBLICATIONS

D. Hardt, Ed., RFC 6749 "The OAuth 2.0 Authorization Framework", Oct. 2012, Internet Engineering Task Force (IETF), pp. 1-76.*

Jones et al, RFC 6750 "The OAuth 2.0 Authorization Framework: Bearer Token Usage", Oct. 2012, Internet Engineering Task Force (IETF), pp. 1-18.*

"BIG-IP® Analytics: Implementations," Version 11.3, Publication No. MAN-0357-03, F5 Networks, Inc., pp. 1-40, Nov. 15, 2012.

"BIG-IP® Local Traffic Manager™ : Concepts," Version 11.4., Publication No. MAN-0377-05, F5 Networks, Inc, pp. 1-178, Sep. 26, 2013.

"BIG-IP® Local Traffic Manager™ : Implementations," Version 11.4, Publication No. MAN-0293-08, F5 Networks, Inc., pp. 1-234, Nov. 19, 2014.

"BIG-IP® Local Traffic Manager™ : Monitors Reference", Version 11.4, Publication No. MAN 0470-00, F5 Networks, Inc., pp. 1-106, Nov. 26, 2013.

"Operations Guide 1.0 F5 Local Traffic Manager and Global Traffic Manager," Publication No. BIG-IP LTMGTMOps-01_0_0, F5 Networks, pp. 1-144, Dec. 12, 2014.

"Release Note: BIG-IP LTM and TMOS," Version 11.4.1, F5 Networks, Inc., pp. 1-58, Dec. 18, 2014.

"BIG-IP Application Security Manager Operations Guide," Publication No. BIG-IP ASMOps 01_1, F5 Networks, Inc., pp. 1-181, Jul. 2016.

"BIG-IP ASM," Version 11.5.0, Release Notes, F5 Networks, Inc., pp. 1-44, Apr. 12, 2016.

"BIG-IP ASM," Version 11.6.1, Release Notes, F5 Networks, Inc., pp. 1-18, Jun. 13, 2016.

"BIG-IP® Analytics: Implementations," Version 11.5, Publication No. MAN-0357-05, F5 Networks, Inc., pp. 1-50, Aug. 25, 2015.

"BIG-IP® Analytics: Implementations," Version 11.6, Publication No. MAN-0357-06, F5 Networks, Inc. pp. 1-62, Aug. 24, 2015.

"BIG-IP® Application Security Manager™ : Getting Started," Version 11.6, Publication No. MAN-0285-09, F5 Networks, Inc., pp. 1-78, Aug. 20, 2014.

"BIP-IP® Application Security Manager™ : Implementations," Version 11.6, Publication No. MAN-0358-07, F5 Networks, Inc., pp. 1-420, Aug. 20, 2014.

"BIG-IP® Application Security Manager™ : Implementations," Version 11.5, Publication No. Man-0358-06, F5 Networks, Inc., pp. 1-396, Jan. 27, 2014.

"BIG-IP® Local Traffic Management: Basics," Version 11.6, Publication No. MAN-0538-00, F5 Networks, Inc., pp. 1-74, Mar. 17, 2016.

"BIG-IP® Network Firewall: Policies and Implementations," Version 11.6, Publication No. MAN-0439-04, F5 Networks, Inc., pp. 1-166, Aug. 20, 2014.

"BIG-IP® Systems: DoS Protection and Protocol Firewall Implementations," Version 11.6, Publication No. MAN-0440-03, F5 Networks, Inc., pp. 1-108, Aug. 20, 2014.

"BIG-IP® TMOS®: Concepts," Version 11.5, Publication No. MAN-0378-04, F5 Networks, Inc., pp. 1-148, May 1, 2014.

"BIG-IP® TMOS®: Implementations," Version 11.5, Publication No. MAN-0379-05, F5 Networks, Inc., pp. 1-274, Sep. 2, 2014.

"BIG-IP® DNS Services: Implementations," Version 11.5, Publication No. MAN-0446-02, F5 Networks, Inc., pp. 1-156, Jan. 27, 2014.

"BIG-IP® DNS Services: Implementations," Version 11.3, Publication No. MAN-0446-00, F5 Networks, Inc., pp. 1-76, Feb. 5, 2016.

"BIG-IP® Global Traffic Manger™: Implementations," Version 11.4, Publication No. MAN-0388-03, F5 Networks, Inc., pp. 1-106, Feb. 21, 2014.

"F5 TMOS Operations Guide," Version 12.1, F5 Networks, Inc., Publication No. BIG-IP TMOSOps-02_1, pp. 1-276, Jul. 2016.

Tegeler et al., "BotFinder: Finding Bots in Network Traffic Without Deep Packet Inspection," CoNEXT '12: Conference on Emerging Networking Experiments and Technologies, pp. 349-360. Dec. 10, 2012.

Zhang et al., "Boosting the Scalability of Botnet Detection Using Adaptive Traffic Sampling," In Proceedings of the 6th ACM Symposium on Information, Computer and Communications Security, pp. 124-134, Mar. 22, 2011.

"BIG-IP® TMOS®: Implementations," Version 12.0, Publication No. MAN-0379-09, F5 Networks, Inc., Dec. 21, 2015.

"BIG-IP® System and SafeNet® Luna SA HSM: Implementations," Version 11.6, Publication No. MAN-0496-01, F5 Networks, Inc., pp. 1-26, Oct. 21, 2016.

Rossow et al., "Sandnet: Network Traffic Analysis of Malicious Software," Proceedings of the First Workshop on Building Analysis Datasets and Gathering Experience Returns for Security, pp. 78-88, Apr. 10, 2011.

"BIG-IP AASM Operations Guide," Version 14.0, F5 Networks, Inc., pp. 1-102, Dec. 2018.

"BIG-IP® Application Security Manager™: Getting Started," Version 12.1, Publication No. MAN-0285-11, F5 Networks, Inc., pp. 1-70, Jul. 11, 2017.

"BIG-IP® Applicatin Security Manager™: Attack and Bot Signatures," Version 12.1, Publication No. MAN-0578-01 F5 Networks, Inc., pp. 1-50, Nov. 4, 2016.

"BIG-IP® Application Security Manager™: Implementations," Version 12.1, Publicaiton No. MAN-0358-09, F5 Networks, Inc., pp. 1-388, Sep. 29, 2017.

UK Search Report for Application No. GB1705857.9, dated Oct. 11, 2017, 1 pp.

"BIG-IP® Application Security Manager™: Implementations," Version 13.0, Publication No. MAN-358-10, F5 Networks, Inc., pp. 1-348. Nov. 10, 2017.

"What is Passwordless?," Azure Active Directory Passwordless Sign in (Preview)—Microsoft Docs, pp. 1-5, Aug. 4, 2019.

Wang et al., "Engaging Edge Networks in Preventing and Mitigating Undesirable Network Traffic," 2007 3rd IEEE Workshop on Secure Network Protocols, 6 pp, Oct. 16, 2007.

BIG-IP® Access Policy Manager®: Implementations, Version 13.0, F5 Networks, Inc. (2017).

* cited by examiner

METHODS FOR MANAGING A FEDERATED IDENTITY ENVIRONMENT BASED ON APPLICATION AVAILABILITY AND DEVICES THEREOF

This application claims the benefit of U.S. Provisional Patent Application Ser. No. 62/505,565, filed May 12, 2017, which is hereby incorporated by reference in its entirety.

FIELD

This technology generally relates to methods and devices for network traffic management and, more particularly, to methods for managing a federated identity environment based on application availability and devices thereof.

BACKGROUND

Federated identity environment provides a way of securely exchanging identity information across internet domains. When a user accesses an application, the service provider component of the application redirects the user to the identity provider for user authentication. The user is authenticated by the identity provider and redirected back to the service provider with a token, then the service provider validates the token with the identity provider and allows access to the application. The tokens generated by the identity provider have time based validity and the users are allowed to access the service provider applications as long as the tokens are valid. The identity providers use administrator configured timeout settings to generate the access tokens and they provide authentication authority services. Tokens are issued as long as the user passes the authentication successfully. Because identity provide authentication is performed without considering the availability of the application, the end-users may encounter a suboptimal experience when the service provider applications are not available due to various reasons such as scheduled maintenance or heavy load.

SUMMARY

A method for managing a federated identity environment based on application availability includes identifying a current status of one or more applications. Next, a response to a received request is generated based on the identified current status and a status of user authentication, wherein the generated response comprises an access token and a notification message corresponding to the identified current status. The generated response is provided to the client.

A non-transitory computer readable medium having stored thereon instructions for managing a federated identity environment based on application availability comprising machine executable code which when executed by at least one processor, causes the processor to perform steps including identifying a current status of one or more applications. Next, a response to a received request is generated based on the identified current status and a status of user authentication, wherein the generated response comprises an access token and a notification message corresponding to the identified current status. The generated response is provided to the client.

A network traffic management apparatus including at least one of configurable hardware logic configured to be capable of implementing or a processor coupled to a memory and configured to execute programmed instructions stored in the memory to identifying a current status of one or more applications. Next, a response to a received request is generated based on the identified current status and a status of user authentication, wherein the generated response comprises an access token and a notification message corresponding to the identified current status. The generated response is provided to the client.

A network traffic management system, comprising one or more traffic management apparatuses, client devices, or server devices, the network traffic management system comprising memory comprising programmed instructions stored thereon and one or more processors configured to be capable of executing the stored programmed instructions to identifying a current status of one or more applications. Next, a response to a received request is generated based on the identified current status and a status of user authentication, wherein the generated response comprises an access token and a notification message corresponding to the identified current status. The generated response is provided to the client.

This technology provides a number of advantages including providing a method, non-transitory computer readable medium and apparatus that effectively assists with managing a federated identity environment based on application availability. The disclosed technology is able to provide better end-user experience and improved access control using the application availability information and prevent race conditions or unusably short user sessions.

DETAILED DESCRIPTION

Figure 1:
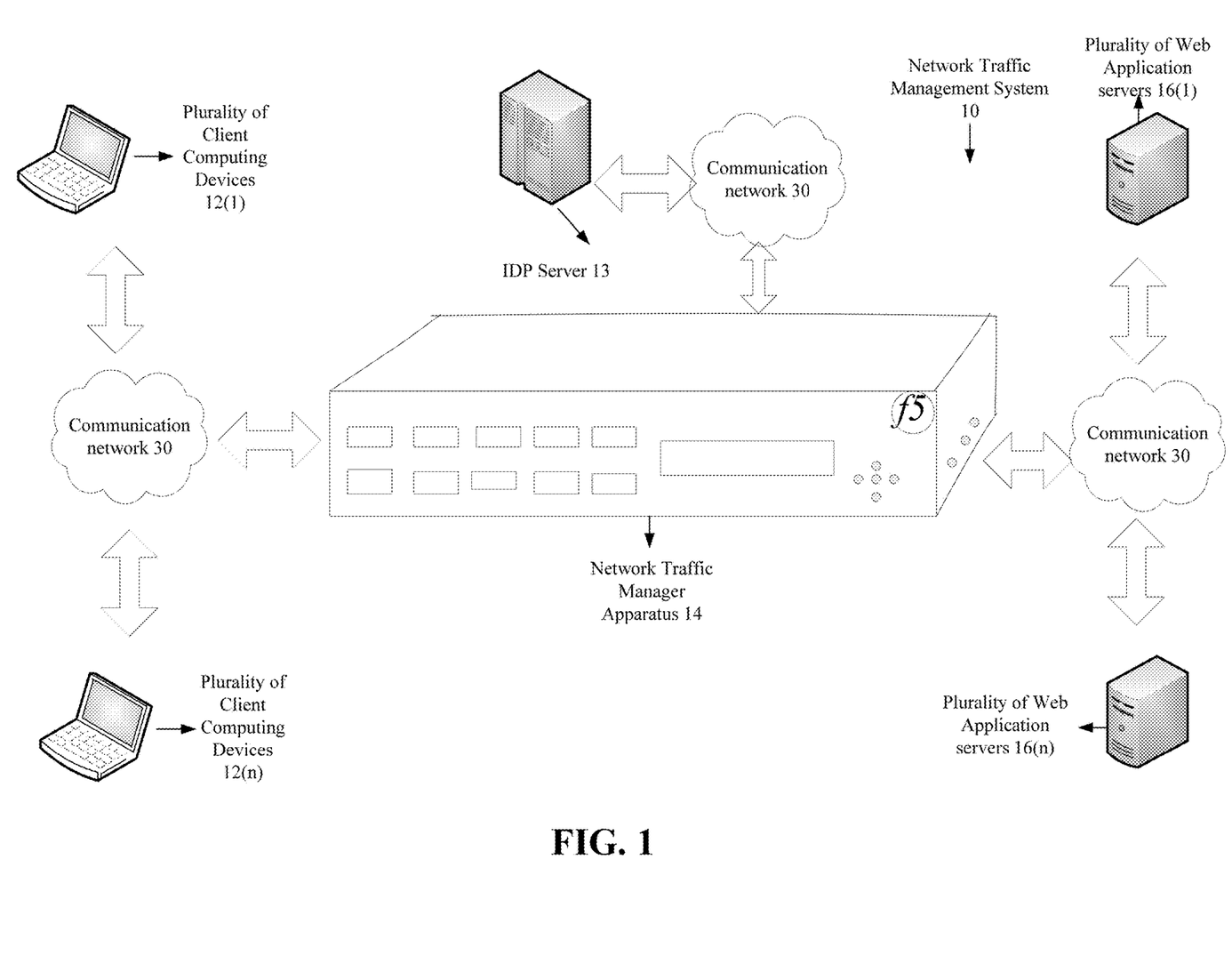
FIG. 1 is an example of a block diagram of a network traffic management system including a network traffic management apparatus for managing a federated identity environment based on application availability.
Figure 2:
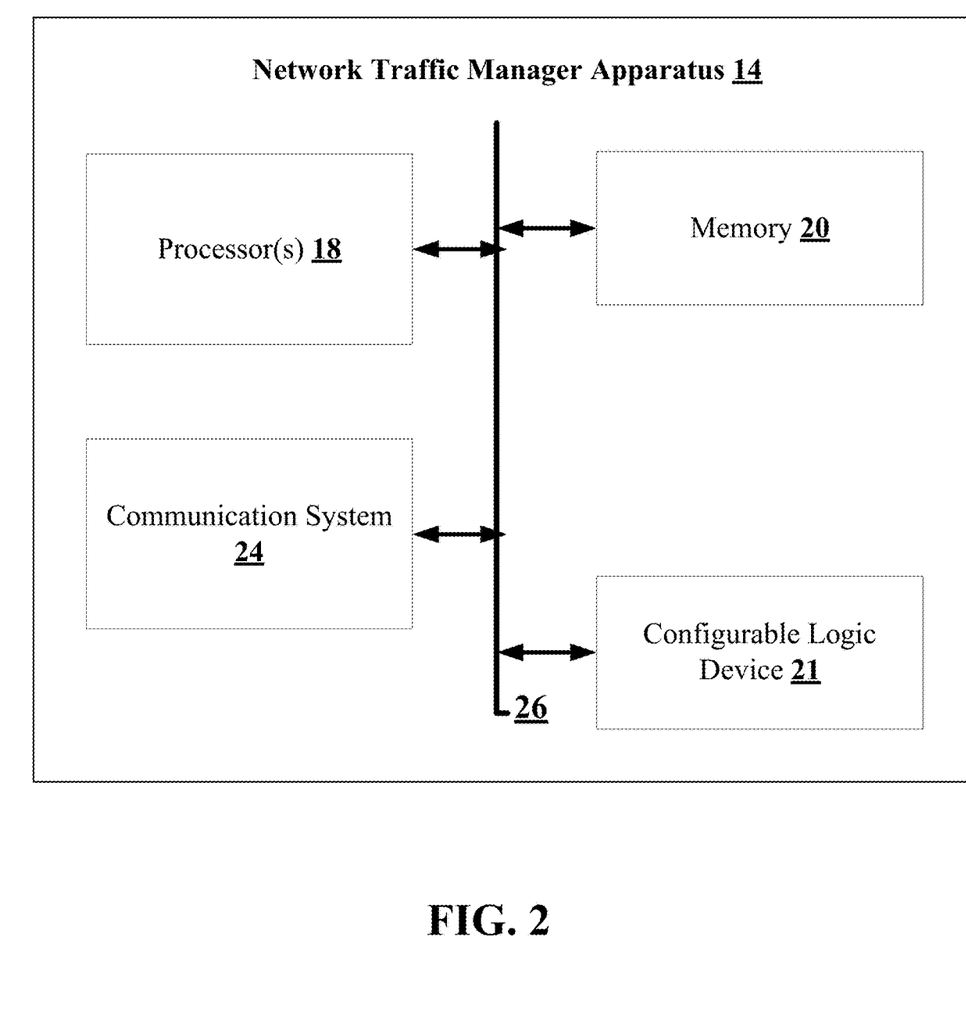
FIG. 2 is an example of a block diagram of a network traffic management apparatus.

An example of a network traffic management system 10 which incorporates a network traffic management system for managing a federated identity environment based on application availability with the network traffic manager apparatus 14 is illustrated in FIGS. 1 and 2. The exemplary network traffic management system 10 includes a plurality of client computing devices 12(1)-12(n), an identity provider (IDP) server 13, a network traffic manager apparatus 14, and a plurality of web application servers 16(1)-16(n) which are coupled together by communication networks 30, although the network traffic management system can include other types and numbers of systems, devices, components, and/or elements and in other topologies and deployments. While not shown, the exemplary network traffic management system 10 may include additional network components, such as routers, switches and other devices, which are well known to those of ordinary skill in the art and thus will not be described here. This technology provides a number of advantages including managing a federated identity environment based on application availability.

Referring more specifically to FIGS. 1 and 2, the network traffic manager apparatus 14 of the network traffic management system 10 is coupled to the plurality of client computing devices 12(1)-12(n) through the communication network 30, although the plurality of client computing devices 12(1)-12(n) and network traffic manager apparatus 14 may be coupled together via other topologies. Additionally, the network traffic manager apparatus 14 is coupled to the plurality of web application servers 16(1)-16(n) through the communication network 30, although the web application servers 16(1)-16(n) and the network traffic manager apparatus 14 may be coupled together via other topologies. Further, the network traffic manager apparatus 14 is coupled to the IDP server 13 through the communication network 30, although the IDP server 13 and network traffic manager apparatus 14 may be coupled together via other topologies The network traffic manager apparatus 14 assists with managing a federated identity environment based on application availability as illustrated and described by way of the examples herein, although the network traffic manager apparatus 14 may perform other types and/or numbers of functions. As illustrated in FIG. 2, the network traffic manager apparatus 14 includes processor or central processing unit (CPU) 18, memory 20, optional configurable hardware logic 21, and a communication system 24 which are coupled together by a bus device 26 although the network traffic manager apparatus 14 may comprise other types and numbers of elements in other configurations. In this example, the bus 26 is a PCI Express bus in this example, although other bus types and links may be used.

The processors 18 within the network traffic manager apparatus 14 may execute one or more computer-executable instructions stored in memory 20 for the methods illustrated and described with reference to the examples herein, although the processor can execute other types and numbers of instructions and perform other types and numbers of operations. The processor 18 may comprise one or more central processing units ("CPUs") or general purpose processors with one or more processing cores, such as AMD® processor(s), although other types of processor(s) could be used (e.g., Intel®).

Figure 3:
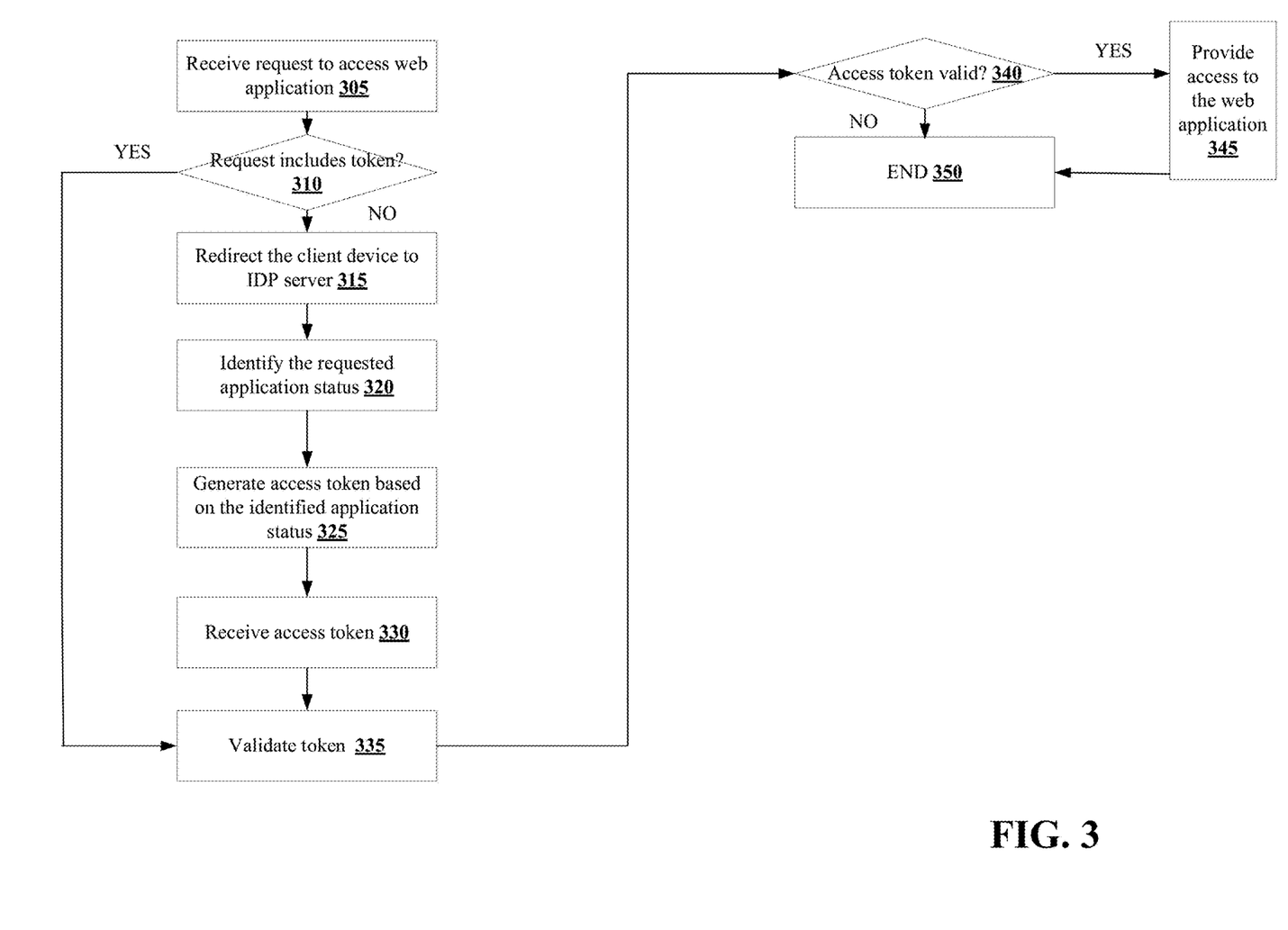
FIG. 3 is an exemplary flowchart of a method for managing a federated identity environment based on application availability.

The memory 20 within the network traffic manager apparatus 14 may comprise one or more tangible storage media, such as RAM, ROM, flash memory, CD-ROM, floppy disk, hard disk drive(s), solid state memory, DVD, or any other memory storage types or devices, including combinations thereof, which are known to those of ordinary skill in the art. The memory 20 may store one or more non-transitory computer-readable instructions of this technology as illustrated and described with reference to the examples herein that may be executed by the processor 18. The exemplary flowchart shown in FIG. 3 is representative of example steps or actions of this technology that may be embodied or expressed as one or more non-transitory computer or machine readable instructions stored in the memory 20 that may be executed by the processor 18 and/or may be implemented by configured logic in the optional configurable logic 21.

Figure 4:
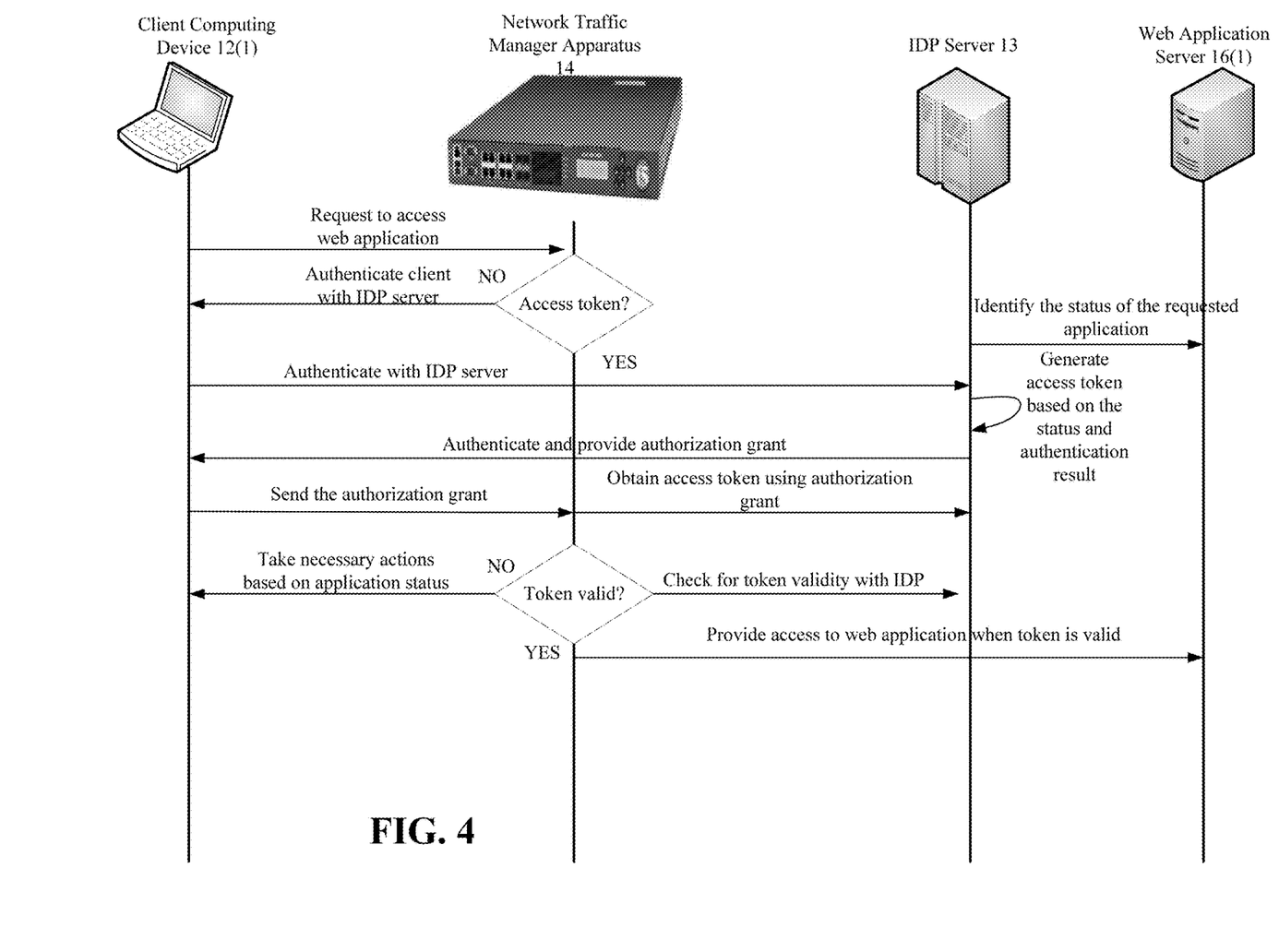
FIG. 4 is an exemplary sequence diagram for managing a federated identity environment based on application availability.

Accordingly, the memory 20 of the network traffic manager apparatus 14 can store one or more applications that can include computer executable instructions that, when executed by the network traffic manager apparatus 14, causes the network traffic manager apparatus 14 to perform actions, such as to transmit, receive, or otherwise process messages, for example, and to perform other actions described and illustrated below with reference to FIGS. 3-4. The application(s) can be implemented as module or components of another application. Further, the application(s) can be implemented as operating system extensions, module, plugins, or the like. The application(s) can be implemented as module or components of another application. Further, the application(s) can be implemented as operating system extensions, module, plugins, or the like. Even further, the application(s) may be operative in a cloud-based computing environment. The application(s) can be executed within virtual machine(s) or virtual server(s) that may be managed in a cloud-based computing environment. Also, the application(s), including the network traffic manager apparatus 14 itself, may be located in virtual server(s) running in a cloud-based computing environment rather than being tied to one or more specific physical network computing devices. Also, the application(s) may be running in one or more virtual machines (VMs) executing on the network traffic manager apparatus 14. Additionally, in at least one of the various embodiments, virtual machine(s) running on the network traffic manager apparatus 14 may be managed or supervised by a hypervisor.

The optional configurable hardware logic device 21 in the network traffic manager apparatus 14 may comprise specialized hardware configured to implement one or more steps of this technology as illustrated and described with reference to the examples herein. By way of example only, the optional configurable logic hardware device 21 may comprise one or more of field programmable gate arrays ("FPGAs"), field programmable logic devices ("FPLDs"), application specific integrated circuits (ASICs") and/or programmable logic units ("PLUs").

The communication system 24 in the network traffic manager apparatus 14 is used to operatively couple and communicate between the network traffic manager apparatus 14, the plurality of client computing devices 12(1)-12(n), the IDP server 13, and the plurality of web application servers 16(1)-16(n) which are all coupled together by communication network 30 such as one or more local area networks (LAN) and/or the wide area network (WAN), although other types and numbers of communication networks or systems with other types and numbers of connections and configurations to other devices and elements may be used. By way of example only, the communication network such as local area networks (LAN) and the wide area network (WAN) can use TCP/IP over Ethernet and industry-standard protocols, including NFS, CIFS, SOAP, XML, LDAP, and SNMP, although other types and numbers of communication networks, can be used. In this example, the bus 26 is a PCI Express bus in this example, although other bus types and links may be used.

Each of the plurality of client computing devices 12(1)-12(n) of the network traffic management system 10, include a central processing unit (CPU) or processor, a memory, input/display device interface, configurable logic device and an input/output system or I/O system, which are coupled together by a bus or other link. The plurality of client computing devices 12(1)-12(n), in this example, may run interface applications, such as Web browsers, that may provide an interface to make requests for and send and/or receive data to and/or from the web application servers 16(1)-16(n) via the network traffic manager apparatus 14. Additionally, the plurality of client computing devices 12(1)-12(n) can include any type of computing device that can receive, render, and facilitate user interaction, such as client computers, network computer, mobile computers, mobile phones, virtual machines (including cloud-based computer), or the like. Each of the plurality of client computing devices 12(1)-12(n) utilizes the network traffic manager apparatus 14 to conduct one or more operations with the web application servers 16(1)-16(n), such as to obtain data and/or access the applications from one of the web application servers 16(1)-16(n), by way of example only, although other numbers and/or types of systems could be utilizing these resources and other types and numbers of functions utilizing other types of protocols could be performed.

The IDP server 13 of the network traffic management system include a central processing unit (CPU) or processor, a memory, and a communication system, which are coupled together by a bus or other link, although other numbers and/or types of network devices could be used. Generally, the IDP server 13 assists with generating and providing access tokens, via the communication network 30 according to the HTTP-based application RFC protocol or the CIFS or NFS protocol in this example, but the principles discussed herein are not limited to this example and can include other application protocols. A series of applications may run on the IDP server 13 that allows the transmission of data requested by the network traffic manager apparatus 14. It is to be understood that the IDP server 13 may be hardware or software or may represent a system with multiple external resource servers, which may include internal or external networks. In this example the IDP server 13 may be any version of Microsoft® IIS servers or Apache® servers, although other types of servers may be used.

Each of the plurality of web application servers 16(1)-16(n) of the network traffic management system include a central processing unit (CPU) or processor, a memory, and a communication system, which are coupled together by a bus or other link, although other numbers and/or types of network devices could be used. Generally, the plurality of web application servers 16(1)-16(n) process requests for providing access to one or more enterprise web applications received from the plurality of client computing devices 12(1)-12(n), network traffic manager apparatus 14, via the communication network 30 according to the HTTP-based application RFC protocol or the CIFS or NFS protocol in this example, but the principles discussed herein are not limited to this example and can include other application protocols. A series of applications may run on the plurality web application servers 16(1)-16(n) that allows the transmission of applications requested by the plurality of client computing devices 12(1)-12(n), or the network traffic manager apparatus 14. The plurality of web application servers 16(1)-16(n) may provide data or receive data in response to requests directed toward the respective applications on the plurality web application servers 16(1)-16(n) from the plurality of client computing devices 12(1)-12(n) or the network traffic manager apparatus 14. It is to be understood that the plurality of web application servers 16(1)-16(n) may be hardware or software or may represent a system with multiple external resource servers, which may include internal or external networks. In this example the plurality of web application servers 16(1)-16(n) may be any version of Microsoft® IIS servers or Apache® servers, although other types of servers may be used.

Although the plurality of web application servers 16(1)-16(n) are illustrated as single servers, one or more actions of the IDP server 13 and each of the plurality of web application servers 16(1)-16(n) may be distributed across one or more distinct network computing devices. Moreover, the plurality of web application servers 16(1)-16(n) are not limited to a particular configuration. Thus, the plurality of plurality web application servers 16(1)-16(n) may contain a plurality of network computing devices that operate using a master/slave approach, whereby one of the network computing devices of the plurality of web application servers 16(1)-16(n) operate to manage and/or otherwise coordinate operations of the other network computing devices. The plurality of web application servers 16(1)-16(n) may operate as a plurality of network computing devices within cluster architecture, a peer-to peer architecture, virtual machines, or within a cloud architecture.

Thus, the technology disclosed herein is not to be construed as being limited to a single environment and other configurations and architectures are also envisaged. For example, the one or more of the plurality of web application servers 16(1)-16(n) depicted in FIG. 1 can operate within network traffic manager apparatus 14 rather than as a standalone server communicating with network traffic manager apparatus 14 via the communication network(s) 30. In this example the plurality of web application servers 16(1)-16(n) operate within the memory 20 of the network traffic manager apparatus 14.

While the network traffic manager apparatus 14 is illustrated in this example as including a single device, the network traffic manager apparatus 14 in other examples can include a plurality of devices or blades each with one or more processors each processor with one or more processing cores that implement one or more steps of this technology. In these examples, one or more of the devices can have a dedicated communication interface or memory. Alternatively, one or more of the devices can utilize the memory, communication interface, or other hardware or software components of one or more other communicably coupled of the devices. Additionally, one or more of the devices that together comprise network traffic manager apparatus 14 in other examples can be standalone devices or integrated with one or more other devices or applications, such as one of the IDP server 13, plurality of web application servers 16(1)-16(n) or, the network traffic manager apparatus 14, or applications coupled to the communication network(s), for example. Moreover, one or more of the devices of the network traffic manager apparatus 14 in these examples can be in a same or a different communication network 30 including one or more public, private, or cloud networks, for example.

Although an exemplary network traffic management system 10 with the plurality of client computing devices 12(1)-12(n), the IDP server 13, the network traffic manager apparatus 14, and the plurality of web application servers 16(1)-16(n), communication networks 30 are described and illustrated herein, other types and numbers of systems, devices, blades, components, and elements in other topologies can be used. It is to be understood that the systems of the examples described herein are for exemplary purposes, as many variations of the specific hardware and software used to implement the examples are possible, as will be appreciated by those skilled in the relevant art(s).

Further, each of the systems of the examples may be conveniently implemented using one or more general purpose computer systems, microprocessors, digital signal processors, and micro-controllers, programmed according to the teachings of the examples, as described and illustrated herein, and as will be appreciated by those of ordinary skill in the art.

One or more of the components depicted in the network traffic management system, such as the network traffic manager apparatus 14, the plurality of client computing devices 12(1)-12(n), the IDP server 13, the plurality of web application servers 16(1)-16(n), for example, may be configured to operate as virtual instances on the same physical machine. In other words, one or more of network traffic manager apparatus 14, the IDP server 13, the plurality of client computing devices 12(1)-12(n), or the plurality of web application servers 16(1)-16(n) illustrated in FIG. 1 may operate on the same physical device rather than as separate devices communicating through a network as depicted in FIG. 1. There may be more or fewer plurality of client computing devices 12(1)-12(n), the IDP server 13, network traffic manager apparatus 14, or the plurality of web application servers 16(1)-16(n) than depicted in FIG. 1. The plurality of client computing devices 12(1)-12(n), the IDP server 13, the plurality of web application servers 16(1)-16(n) could be implemented as applications on network traffic manager apparatus 14.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples may also be embodied as a non-transitory computer readable medium having instructions stored thereon for one or more aspects of the technology as described and illustrated by way of the examples herein, which when executed by a processor (or configurable hardware), cause the processor to carry out the steps necessary to implement the methods of the examples, as described and illustrated herein.

An example of a method for managing a federated identity environment based on application availability will now be described with reference to FIGS. 1-4. Particularly with reference to FIGS. 3 and 4, in step 305, the network traffic manager apparatus 14 receives a request from one of the plurality of client computing devices 12(1)-12(n) to access a web application in the plurality of web applications 16(1)-16(n), although the network traffic manager apparatus 14 can receive other types of requests from other devices.

Next in step 310, the network traffic manager apparatus 14 determines when the received request includes an access token. Accordingly, when the network traffic manager apparatus 14 determines that the received request includes the access token, then the Yes branch is taken to step 335 which will further be illustrated and described below. However, when the network traffic manager apparatus 14 determines that the received request does not include the received token, then the No branch is taken to step 315.

Next in step 315, the network traffic manager apparatus 14 redirects the requesting one of the plurality of client computing devices 12(1)-12(n) to the IDP server 13 for the purpose of authentication. In this example, the requesting one of the plurality of client computing devices 12(1)-12(n) provides the IDP server 13 with the necessary credentials to access the web application. The IDP server 13 then determines the validity of the credentials and when it is determined that the credentials are valid.

Next in step 320, the network traffic manager apparatus 14 identifies the current status of the requested application executing in one of the plurality of web application servers 16(1)-16(n). In this example, the network traffic manager apparatus 14 identifies if the requested application is: available for servicing the request; unavailable for servicing the received request; scheduled for maintenance; decommissioned; or becomes unavailable in a short period of time, although the network traffic manager apparatus 14 can check for other types of statuses of the requested application in the plurality of web application servers 16(1)-16(n). In another example, the status of each of the plurality of web application servers 16(1)-16(n) can be sent periodically and the network traffic manager apparatus 14 and/or the IDP server 13 can obtain the sent application status information to determine the status of the plurality of web application servers 16(1)-16(n). Additionally, in this example, the IDP server 13 a new status of the identified application can be determined and the IDP server 13 revokes all access tokens that were issued for the any application on the plurality of web application servers 16(1)-16(n) when the current status of the application indicates that it has been decommissioned.

In step 325, the IDP server 13 generates access token based on the current status of the application. By way of example, the IDP server 13 returns the access token back to the requesting one of the plurality of client computing devices 12(1)-12(n) and providing a notification indicating that the application is not available when the current status indicates that the requested application is not available to service the request. In another example, when the requested application is scheduled for maintenance, the IDP server 13 with returning the access token back to the requesting one of the plurality of client computing devices 12(1)-12(n) along with a proper validity period to the provided access token so that the access token expires when the application is taken down for maintenance. In another example, when the current status of the application is going to be unavailable in the near future, the IDP server 13 providing a notification to the requesting one of the plurality of client computing devices 12(1)-12(n) indicating that the requested application is unavailable to prevent race conditions or unusable short user sessions. While it is illustrated that the IDP server 13 performs the step of performing the necessary actions, in another example, the network traffic manager apparatus 14 can alone perform the steps of performing the actions. In yet another example, the combination of the IDP server 13 and the network traffic manager apparatus 14 can perform the steps the necessary actions.

In step 330, the network traffic manager apparatus 14 receives the access token from the requesting one of the plurality of client computing devices 12(1)-12(n), although the network traffic manager apparatus 14 can receive other types or amounts data from the requesting client computing device confirming the authentication. In another example, the IDP server 13 creates and stores the access token but provides an authorization grant code to the network traffic manager apparatus 14. Using the authorization grant code, the network traffic manager apparatus 14 can obtain the corresponding access token from the IDP server 13.

In step 335, the network traffic manager apparatus 14 validates the obtained or received (from the request in step 305) access token with the IDP server 13, although the network traffic manager apparatus 14 can authenticate the obtained access token using other techniques. In this example, the network traffic manager apparatus 14 validates the access token by determining if the requesting one of the plurality of client computing devices 12(1)-12(n) has the required rights to access the web application and also determines whether the time period of the access token has expired by checking with the IDP server 13, although the network traffic manager apparatus 14 can use other techniques to validate the access token. Optionally, in another example, the access token can be validated internally without communicating with the IDP server 13.

Next in step 340, the network traffic manager apparatus 14 determines when the received access token is valid based on the identified status of the requested application, expiration of the token, and/or whether the requesting one of the plurality of client computing devices 12(1)-12(n) has the access rights to use the application, although the network traffic manager apparatus 14 can determine the validity using other techniques. Accordingly, when the network traffic manager apparatus 14 determines that the access token is valid, then the Yes branch is taken to step 345. Alternatively, the network traffic manager apparatus 14 can validate the token locally based on the data present within the memory 20, although the network traffic manager apparatus 14 can use other techniques to validate the access token.

In step 345, the network traffic manager apparatus 14 provides the requesting one of the plurality of client computing devices 12(1)-12(n), access to the requested web application. In this example, the network traffic manager apparatus 14 provides the requesting one of the plurality of client computing devices 12(1)-12(n), access to the requested web application when the current status of the requested web application is available for servicing a new request and the access token is determined to be valid.

However if back in step 345, when the network traffic manager apparatus 14 determines that the access token is not valid, then the No branch is taken to step 350 where the exemplary method ends.

Accordingly, as illustrated and described by way of the examples herein, this technology provides a number of advantages including providing methods, non-transitory computer readable media and devices for managing a federated identity environment based on application availability. Using the above illustrated examples, the disclosed technology is able to provide better end-user experience and improved access control using the application availability information.

Having thus described the basic concept of the technology, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the technology. Additionally, the recited order of processing elements or sequences, or the use of numbers, letters, or other designations therefore, is not intended to limit the claimed processes to any order except as may be specified in the claims. Accordingly, the technology is limited only by the following claims and equivalents thereto.

What is claimed is:

1. A method for managing a federated identity environment based on application availability, the method implemented by a network traffic management system comprising one or more network traffic apparatuses, client devices, or server devices, the method comprising:
   determining when a received request to access one of the one or more applications fails to include an access token;
   identifying a current status of the requested one of the one or more applications when the received request fails to include the access token;
   generating an access token based on the identified current status of the requested one of the one or more applications when the received request fails to include the access token; and
   providing a client access to the requested one of the one or more applications based on the generated access token and when the client is determined to have an access right to the requested one of the one or more applications.

2. The method as set forth in claim 1 further comprising, providing the requesting client access to the requested one of the one or more web applications when the identified current status of the requested one of the one or more applications is available for servicing.

3. The method as set forth in claim 1 further comprising:
   identifying a new current status of the requested one of the one or more applications; and
   performing one or more access control actions, when the identified new current status of the requested one of the one or more applications is not available for servicing, wherein the one or more access control actions further comprises revoking a plurality of access tokens associated with the requested application and preventing the client from accessing the one or more applications.

4. The method as set forth in claim 1 further comprising, performing the one or more access control actions when the identified current status of the requested one of the one or more applications is available for a period of time, wherein the one or more access control actions further comprises providing access to the requested one of the one or more applications to the requesting client until the expiration of the period of time.

5. The method as set forth in claim 4 further comprising, performing the one or more access control actions when the identified current status of the requested one of the one or more applications is available for less than a threshold time period, wherein the one or more access control actions further comprises preventing the client from accessing the one or more applications.

6. A non-transitory computer readable medium having stored thereon instructions for managing a federated identity environment based on application availability environment comprising executable code which when executed by one or more processors, causes the processors to:
   determine when a received request to access one of the one or more applications fails to include an access token;
   identify a current status of the requested one of the one or more applications when the received request fails to include the access token;
   generate an access token based on the identified current status of the requested one of the one or more applications when the received request fails to include the access token; and
   provide a client access to the requested one of the one or more applications based on the generated access token and when the client is determined to have an access right to the requested one of the one or more applications.

7. The medium as set forth in claim 6 further comprising provide the requesting client access to the requested one of the one or more web applications when the identified current status of the requested one of the one or more applications is available for servicing.

8. The medium as set forth in claim 6 further comprising:
   identify a new current status of the requested one of the one or more applications; and perform one or more access control actions, when the identified new current status of the requested one of the one or more applications is not available for servicing, wherein the one or more access control actions further comprises revoking a plurality of access tokens associated with the requested application and preventing the client from accessing the requested one of the one or more applications.

9. The medium as set forth in claim 6 further comprising, perform the one or more access control actions when the identified current status of the requested one of the one or more applications is available for a period of time, wherein the one or more access control actions further comprises providing access to the requested one of the one or more applications to the requesting client until the expiration of the period of time.

10. The medium as set forth in claim 9 further comprising, perform the one or more access control actions when the identified current status of the requested one of the one or more applications is available for less than a threshold time period, wherein the one or more access control actions further comprises preventing the client from accessing the requested one of the one or more applications.

11. A network traffic manager apparatus, comprising memory comprising programmed instructions stored in the memory and one or more processors configured to be capable of executing the programmed instructions stored in the memory to:
  determine when a received request to access one of the one or more applications fails to include an access token;
  identify a current status of the requested one of the one or more applications when the received request fails to include the access token;
  generate an access token based on the identified current status of the requested one of the one or more applications when the received request fails to include the access token; and
  provide a client access to the requested one of the one or more applications based on the generated access token and when the client is determined to have an access right to the requested one of the one or more applications.

12. The network traffic manager apparatus as set forth in claim 11 wherein the one or more processors are further configured to be capable of executing the programmed instructions stored in the memory to provide the requesting client access to the requested one of the one or more web applications when the identified current status of the requested one of the one or more applications is available for servicing.

13. The network traffic manager apparatus as set forth in claim 11 wherein the one or more processors are further configured to be capable of executing the programmed instructions stored in the memory to:
  identify a new current status of the requested one of the one or more applications; and
  perform one or more access control actions, when the identified new current status of the requested one of the one or more applications is not available for servicing, wherein the one or more access control actions further comprises revoking a plurality of access tokens associated with the requested application and preventing the client from accessing the requested one of the one or more applications.

14. The network traffic manager apparatus as set forth in claim 11 wherein the one or more processors are further configured to be capable of executing the programmed instructions stored in the memory to perform the one or more access control actions when the identified current status of the requested one of the one or more applications is available for a period of time, wherein the one or more access control actions further comprises providing access to the requested one of the one or more applications to the requesting client until the expiration of the period of time.

15. The network traffic manager apparatus as set forth in claim 14 wherein the one or more processors are further configured to be capable of executing the programmed instructions stored in the memory to perform the one or more access control actions when the identified current status of the requested one of the one or more applications is available for less than a threshold time period, wherein the one or more access control actions further comprises preventing the client from accessing the requested one of the one or more applications.

16. A network traffic management system, comprising one or more traffic management apparatuses, client devices, or server devices, the network traffic management system comprising memory comprising programmed instructions stored thereon and one or more processors configured to be capable of executing the stored programmed instructions to:
  determine when a received request to access one of the one or more applications fails to include an access token;
  identify a current status of the requested one of the one or more applications when the received request fails to include the access token;
  generate an access token based on the identified current status of the requested one of the one or more applications when the received request fails to include the access token; and
  provide a client access to the requested one of the one or more applications based on the generated access token and when the client is determined to have an access right to the requested one of the one or more applications.

17. The network traffic management system of claim 16, wherein the one or more processors are further configured to be capable of executing the programmed instructions stored in the memory to provide the requesting client access to the requested one of the one or more web applications when the identified current status of the requested one of the one or more applications is available for servicing.

18. The network traffic management system of claim 16, wherein the one or more processors are further configured to be capable of executing the programmed instructions stored in the memory to:
  identify a new current status of the requested one of the one or more applications; and
  perform one or more access control actions, when the identified new current status of the requested one of the one or more applications is not available for servicing, wherein the one or more access control actions further comprises revoking a plurality of access tokens associated with the requested application and preventing the client from accessing the requested one of the one or more applications.

19. The network traffic management system of claim 16, wherein the one or more processors are further configured to be capable of executing the programmed instructions stored in the memory to perform the one or more access control actions when the identified current status of the requested one of the one or more applications is available for a period of time, wherein the one or more access control actions further comprises providing access to the requested one of the one or more applications to the requesting client until the expiration of the period of time.

20. The network traffic management system of claim 19, wherein the one or more processors are further configured to be capable of executing the programmed instructions stored in the memory to perform the one or more access control actions when the identified current status of the requested one of the one or more applications is available for less than a threshold time period, wherein the one or more access control actions further comprises preventing the client from accessing the requested one of the one or more applications.

\* \* \* \* \*